US009381859B2

(12) United States Patent
Nagata et al.

(10) Patent No.: US 9,381,859 B2
(45) Date of Patent: Jul. 5, 2016

(54) REVERSE PARKING ASSISTANCE WITH REAR VISUAL INDICATOR

(71) Applicant: Toyota Motor Engineering & Manufacturing North America, Inc., Erlanger, KY (US)

(72) Inventors: Katsumi Nagata, Foster City, CA (US); Charan Lota, Canton, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 1 day.

(21) Appl. No.: 14/524,016

(22) Filed: Oct. 27, 2014

(65) Prior Publication Data

US 2016/0114726 A1 Apr. 28, 2016

(51) Int. Cl.
*B60Q 1/48* (2006.01)
*B60Q 9/00* (2006.01)

(52) U.S. Cl.
CPC .................................... *B60Q 9/007* (2013.01)

(58) Field of Classification Search
CPC ............ B60R 2300/806; G01S 15/931; G01S 13/931; G01S 2013/9314; G01S 17/936; G08G 1/168; B62D 15/027; B60Q 9/007
USPC ................ 340/932.2, 435; 701/301; 348/148; 367/118, 129
See application file for complete search history.

(56) References Cited

U.S. PATENT DOCUMENTS

| | | | | |
|---|---|---|---|---|
| 4,490,716 | A * | 12/1984 | Tsuda | G01S 15/04 340/904 |
| 4,528,563 | A * | 7/1985 | Takeuchi | G01S 15/931 340/903 |
| 6,072,391 | A * | 6/2000 | Suzuki | B60K 35/00 340/435 |
| 6,128,576 | A * | 10/2000 | Nishimoto | G01S 7/56 340/435 |
| 8,232,745 | B2 | 7/2012 | Chemel et al. | |
| 8,350,724 | B2 | 1/2013 | Szczerba et al. | |
| 8,536,802 | B2 | 9/2013 | Chemel et al. | |
| 8,618,955 | B2 | 12/2013 | Baker | |
| 2002/0003378 | A1 | 1/2002 | Marcus et al. | |
| 2004/0017287 | A1 | 1/2004 | Rao et al. | |
| 2004/0153243 | A1 | 8/2004 | Shimazaki et al. | |
| 2008/0211651 | A1* | 9/2008 | Beutnagel-Buchner | B62D 1/046 340/932.2 |
| 2013/0158851 | A1 | 6/2013 | Herrmann | |

OTHER PUBLICATIONS

Crimestopper CA-5014 Rear Parking Assist System LED Display with Rear Mount for Plastic Bumpers: Car Electronics, [retrieved Aug. 18, 2014] retrieved from the Internet: <http://www.amazon.com>, 3 pages.
Parking Assist System PTS400EX-F, Manual, Undated, 12 pages.

* cited by examiner

*Primary Examiner* — Thomas Mullen
(74) *Attorney, Agent, or Firm* — Christopher G. Darrow; Darrow Mustafa PC

(57) ABSTRACT

Arrangements relate to providing assistance during reverse parking of a vehicle. A rear environment of the vehicle can be detected for one or more objects located in the rear environment. If an object is detected in the rear environment, a visual alert of the detected object can be provided. The visual alert can be provided in a rear interior portion of the vehicle. The visual alert can be substantially aligned with the location of the detected object in the rear environment. Thus, a rearward-looking driver can be visually alerted of the presence of the detected object in the rear environment.

23 Claims, 6 Drawing Sheets

101
104
100
105
Processor(s)
120
Sensor System
108
121
Transmission Gear Sensor(s)
110
Data Store(s)
Rear Environment Sensor(s)
122
115
Reverse Parking Assist Module
Vehicle Speed Sensor(s)
123
107
106
Camera(s)
125
130
135
Output System
Input System
Forward Display(s)
140
Visual Indicator(s)
145
Display(s)
146
155
Vehicle Systems
Light Source(s)
147
160
Transmission System
Projector(s)
148
Audial Indicator(s)
150
102

REVERSE PARKING ASSISTANCE WITH REAR VISUAL INDICATOR

FIELD

The subject matter described herein relates in general to vehicles and, more particularly, to the reverse parking of vehicles.

BACKGROUND

In some instances, a vehicle can be parked by placing the vehicle in reverse gear so that the vehicle may be backed into a desired parking spot. A driver may look toward the rear of the vehicle when parking in reverse. Some drivers may have a limited field of view of the rear environment of the vehicle due to physical limitations (i.e. vehicle design, size of the rear window, height of the driver, etc.). Some vehicles include a parking assistance system in which video data from the area behind the vehicle is captured by a rear-facing camera system. The video data is presented on a display located in a forward portion of the vehicle, such as in an instrument panel. As a result, a driver must look toward the front of the vehicle to see the video data presented on the display.

SUMMARY

In one respect, the present disclosure is directed to a reverse parking assistance method for a vehicle. The method can include detecting a rear environment of the vehicle for one or more objects located in the rear environment. The method can also include, responsive to detecting an object in the rear environment, providing a visual alert of the detected object in a rear interior portion of the vehicle. The visual alert can be substantially aligned with the location of the detected object in the rear environment. Thus, a rearward-looking driver can be visually alerted of the presence of the detected object in the rear environment.

In another respect, the present disclosure is directed to a reverse parking assistance system for a vehicle. The system can include a vehicle. The vehicle can have a rear interior portion. The system can also include sensor system. The sensor system can be operable to detect a rear environment of the vehicle for one or more objects located in the rear environment. The system can further include a visual indicator.

The system can additionally include a processor. The processor can be located onboard the vehicle. The processor can be programmed to initiate executable operations. The executable operations can include, responsive to detecting an object in the rear environment, activating a portion of the visual indicator. The activated a portion of the visual indicator can be substantially aligned with the location of the detected object in the rear environment. Thus, a visual alert of the presence of the detected object can be provided to a rearward-looking driver.

In yet another respect, the present disclosure is directed to a computer program product for assisting a driver during reverse parking of a vehicle. The computer program product includes a computer readable storage medium having program code embodied therewith. The program code is executable by a processor to perform a method. The method can include detecting a rear environment of the vehicle for one or more objects located in the rear environment. The method can further include, responsive to detecting an object in the rear environment, providing a visual alert of the detected object in a rear interior portion of the vehicle. The visual alert can be substantially aligned with the location of the detected object in the rear environment. Thus, a rearward-looking driver can be visually alerted of the presence of the detected object in the rear environment.

DETAILED DESCRIPTION

Figure 1:
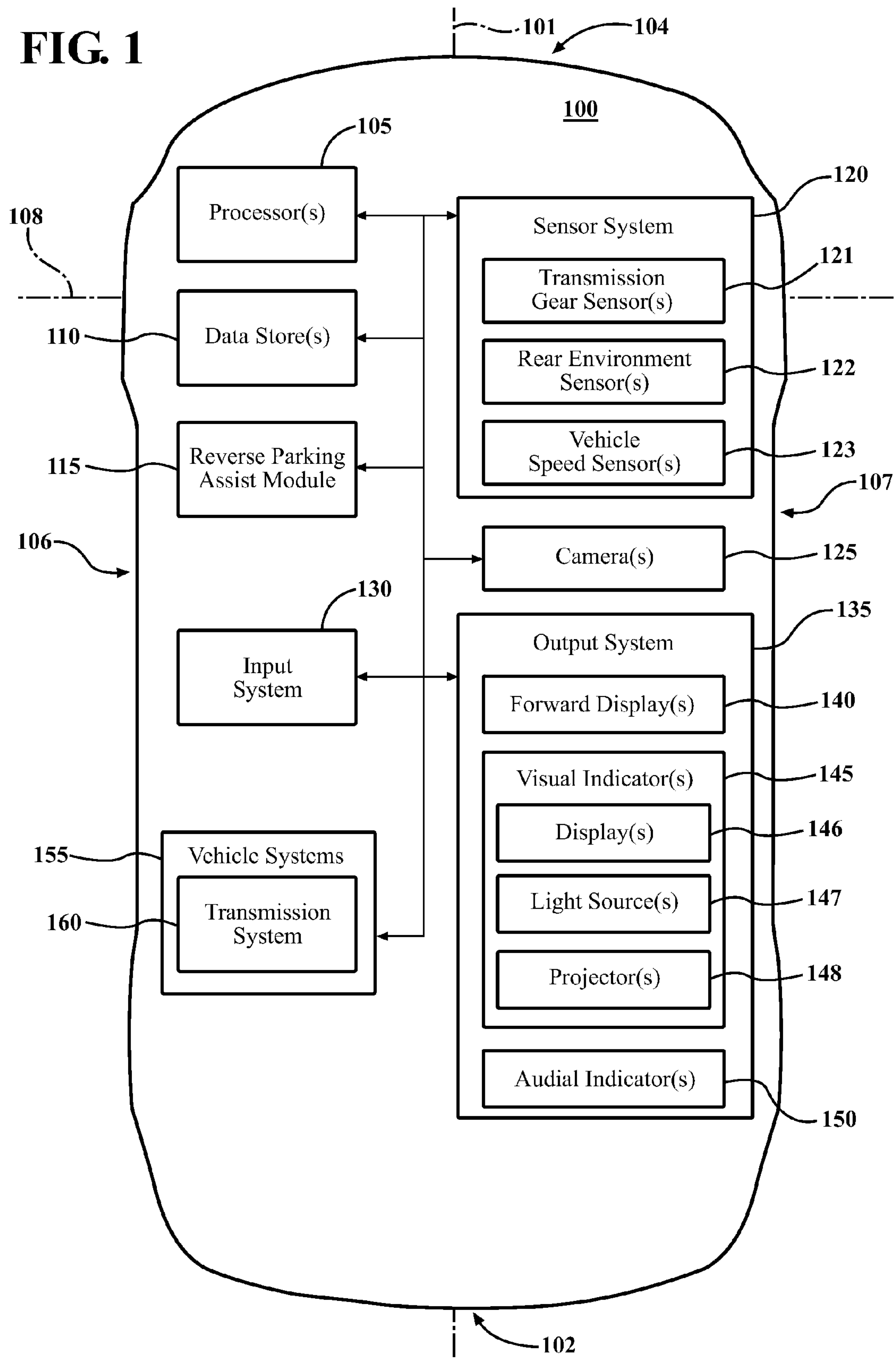
FIG. 1 is an example of a vehicle with a reverse parking assistance system.

This detailed description relates to assisting a driver during the reverse operation of a vehicle, particularly while a driver is reverse parking a vehicle. Arrangements described herein relate to detecting a rear environment of a vehicle for one or more objects located in the rear environment. If an object is detected in the rear environment, a visual alert of the presence of the detected object can be provided in a rear interior portion of the vehicle. The present detailed description relates to systems, methods and computer program products that incorporate at least in part one or more of such features. In at least some instances, such systems, methods and computer program products can, among other things, assist a driver by providing information about the rear environment of the vehicle to the driver when the driver is looking toward the rear of the vehicle.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some implementations, the vehicle 100 may be a watercraft, an aircraft or any other form of motorized transport. In some implementations, arrangements described herein may be used in connection with non-motorized forms of transport.

The vehicle 100 can have an associated longitudinal axis 101, that is, the center axis of the vehicle 100. The vehicle 100 can have an associated longitudinal direction. In this context, "longitudinal direction" is any direction that is substantially parallel to and/or co-linear with the longitudinal axis 101. The vehicle 100 can have a front end 102 and a back end 104. The vehicle 100 can have a first side 106 and a second side 107. In some vehicles, the first side 106 can be the driver side of the vehicle 100, and the second side 107 can be the passenger side of the vehicle 100. In other vehicles, the first side 106 can be the passenger side of the vehicle 100, and the second side 107 can be the driver side of the vehicle 100.

Figure 3:
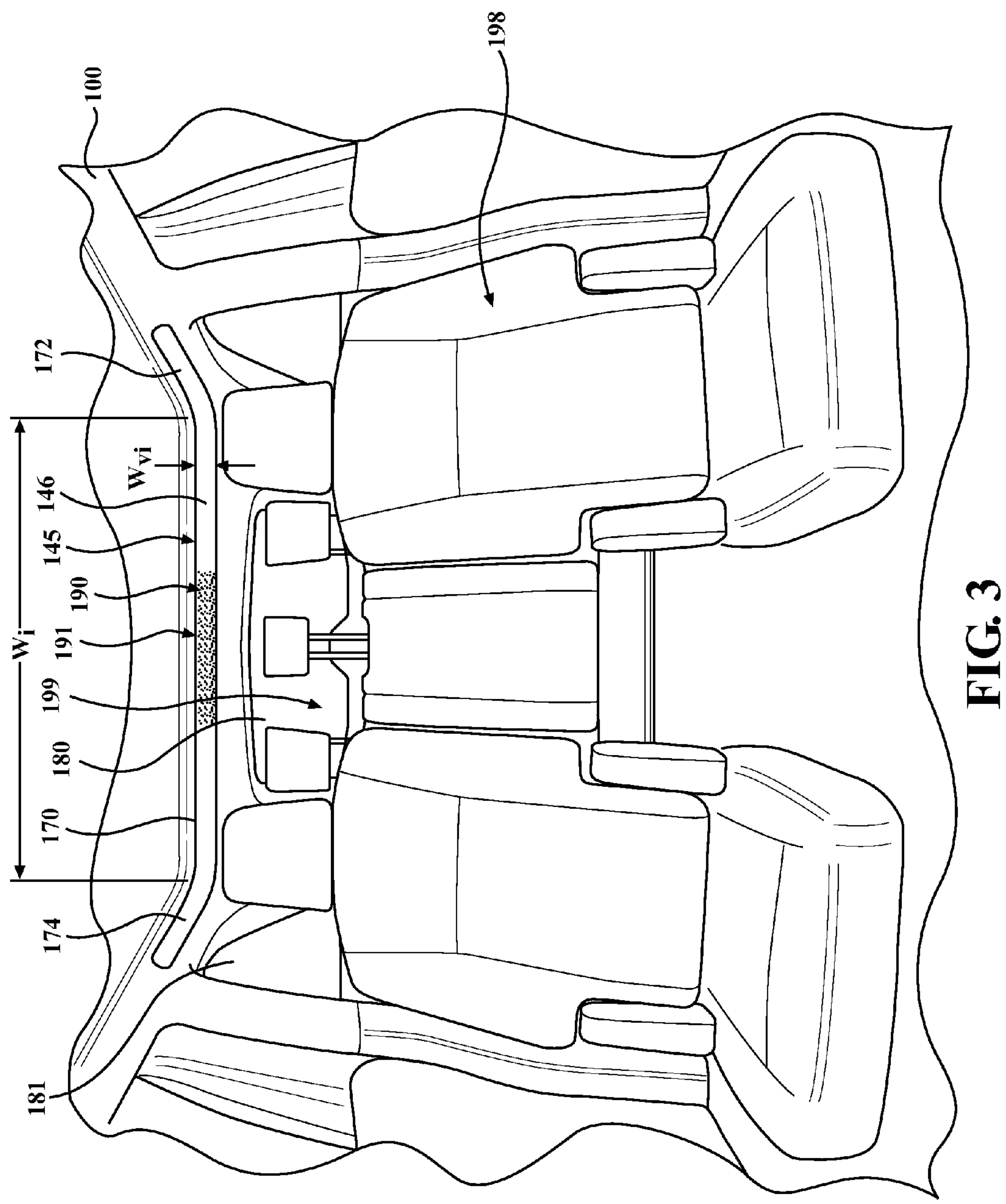
FIG. 3 is an example of a portion of an interior of the vehicle of FIG. 2, wherein a visual indicator provides a visual alert of the object detected in the rear environment of the vehicle.
Figure 5:
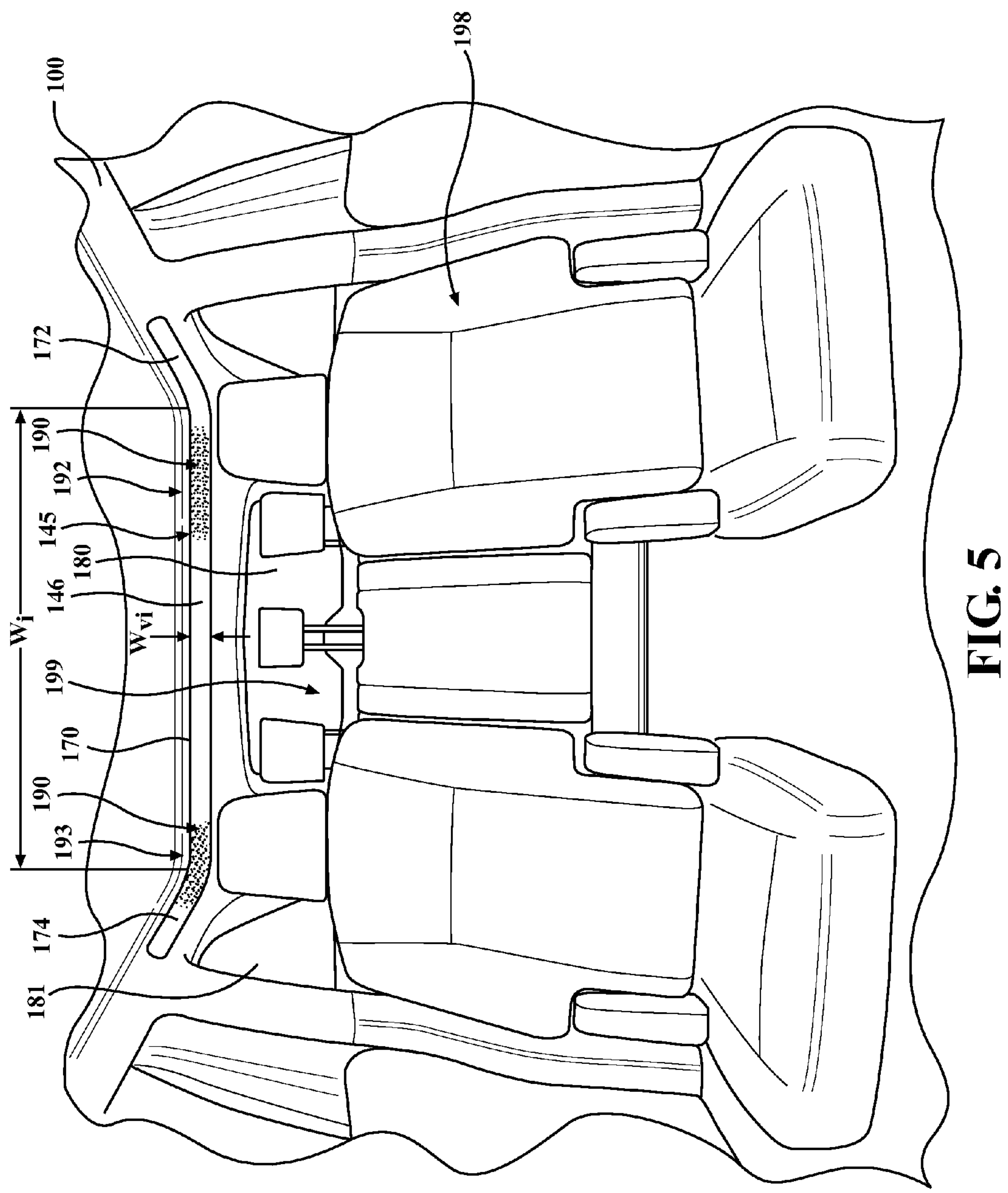
FIG. 5 is an example of a portion of an interior of the vehicle of FIG. 4, wherein a visual indicator provides a visual alert of each of the plurality of objects detected in the rear environment of the vehicle.

The vehicle 100 can have a front interior portion 198 and a rear interior portion 199, as is shown in FIGS. 3 and 5. "Front interior portion" means any part of the interior of a vehicle that is located from the forward facing side of the driver's seat and forward thereof. "Rear interior portion" means any part of the interior of a vehicle that is located rearward of the forward facing side of the driver's seat.

The vehicle 100 can include various elements. Some of the possible elements are shown in FIG. 1 will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, the vehicle 100 may not include one or more of the elements shown in FIG. 1. It should be appreciated that although particular elements are separately defined, each or any of the elements or portions thereof may be otherwise combined or segregated via hardware and/or software.

Further, while the various elements are shown as being located within the vehicle 100 in FIG. 1, it will be understood that one or more of these elements can be located external to vehicle 100. Further, the elements shown may be physically separated by any distance, including large distances.

The vehicle 100 can include one or more processors 105. "Processor" means any component or group of components that are configured to execute any of the processes described herein or any form of instructions to carry out such processes or cause such processes to be performed. The processor 105 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

The processor 105 can include at least one hardware circuit (e.g., an integrated circuit) configured to carry out instructions contained in program code. In arrangements in which there is a plurality of processors 105, such processors can work independently from each other or one or more processors can work in combination with each other. In one or more arrangements, the processor 105 can be a main processor of the vehicle 100. For instance, the processor 105 can be an engine control unit.

The vehicle 100 can include one or more data stores 110 for storing one or more types of data. The data store 110 can include volatile and/or non-volatile memory. Examples of suitable data stores 110 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 110 can be operatively connected to the processor 105 for use thereby. The term "operatively connected," as used throughout this description, can include direct or indirect connections, including connections without direct physical contact.

The vehicle 100 can include a reverse parking assist module 115. The reverse parking assist module 115 can be implemented as computer readable program code that, when executed by a processor, implement the various processes described herein. The reverse parking assist module 115 and/or the data store 110 can be components of the processor 105. Alternatively, the reverse parking assist module 115 and/or the data store 110 can be executed on and/or distributed among other processing systems to which the processor 105 is operatively connected.

The reverse parking assist module 115 can include instructions (e.g., program logic) executable by the processor 105. Such instructions can include instructions to execute various vehicle functions and/or to transmit data to, receive data from, interact with, and/or control the vehicle or one or more systems thereof (e.g. a sensor system 120 and/or one or more of vehicle systems 155). Alternatively or in addition, the data store 110 may contain instructions.

The vehicle 100 can include a sensor system 120. The sensor system 120 can include one or more sensors. "Sensor" means any device, component and/or system that can detect, determine, assess, measure, quantify and/or sense something, directly or indirectly. The one or more sensors can be configured to detect, determine, assess, measure, quantify and/or sense information in real-time. As used herein, the term "real-time" means a level of processing responsiveness that a user or system senses as sufficiently immediate for a particular process or determination to be made, or that enables the processor to keep up with some external process. In arrangements in which the sensor system 120 includes a plurality of sensors, the sensors can work independently from each other or one or more of the sensors can work in combination with each other. The sensor system 120 and/or one or more sensors of the sensor system 120 can be operatively connected to the processor 105, the data store 110, the reverse parking assist module 115 and/or another element, system and/or component of the vehicle 100. The processor 105, the reverse parking assist module 115 and/or another element, system and/or component of the vehicle 100 can process data or information received from the one or more sensors to determine something.

The sensor system 120 can include any suitable type of sensor. For instance, the sensor system 120 can include one or more sensors configured to detect, determine, assess, measure, quantify and/or sense, directly or indirectly, information about the vehicle 100. As an example, the sensor system 120 can include one or more transmission gear sensors 121. The one or more transmission gear sensors 121 can be configured to detect, determine, assess, measure, quantify and/or sense, directly or indirectly, information about which gear of the vehicle's transmission system 160 is currently engaged. More particularly, the sensor system 120 can include one or more sensors configured to detect, determine, assess, measure, quantify and/or sense, directly or indirectly, whether the reverse gear of the vehicle's transmission system 160 is currently engaged.

In some arrangements, the sensor system 120 can include one or more vehicle speed sensors 123. More particularly, the one or more vehicle speed sensors 123 can be configured to detect, determine, assess, measure, quantify and/or sense, directly or indirectly, a current speed of the vehicle 100. As an example, at least one of the vehicle speed sensors 123 can be a speedometer.

In one or more arrangements, the sensor system 120 can include one or more sensors configured to detect, determine, assess, measure, quantify and/or sense, directly or indirectly, information about an environment in which the vehicle 100 is located, including information about objects in the environment. As an example, the sensor system 120 can include one or more rear environment sensors 122. The one or more rear environment sensors 122 can be configured to detect, determine, assess, measure, quantify and/or sense, directly or indirectly, the presence of one or more objects in a rear environment of the vehicle 100, the position of the detected one or more objects and/or the distance between the detected one or more objects and the vehicle 100. The detected objects may be stationary and/or non-stationary objects.

Figure 2:
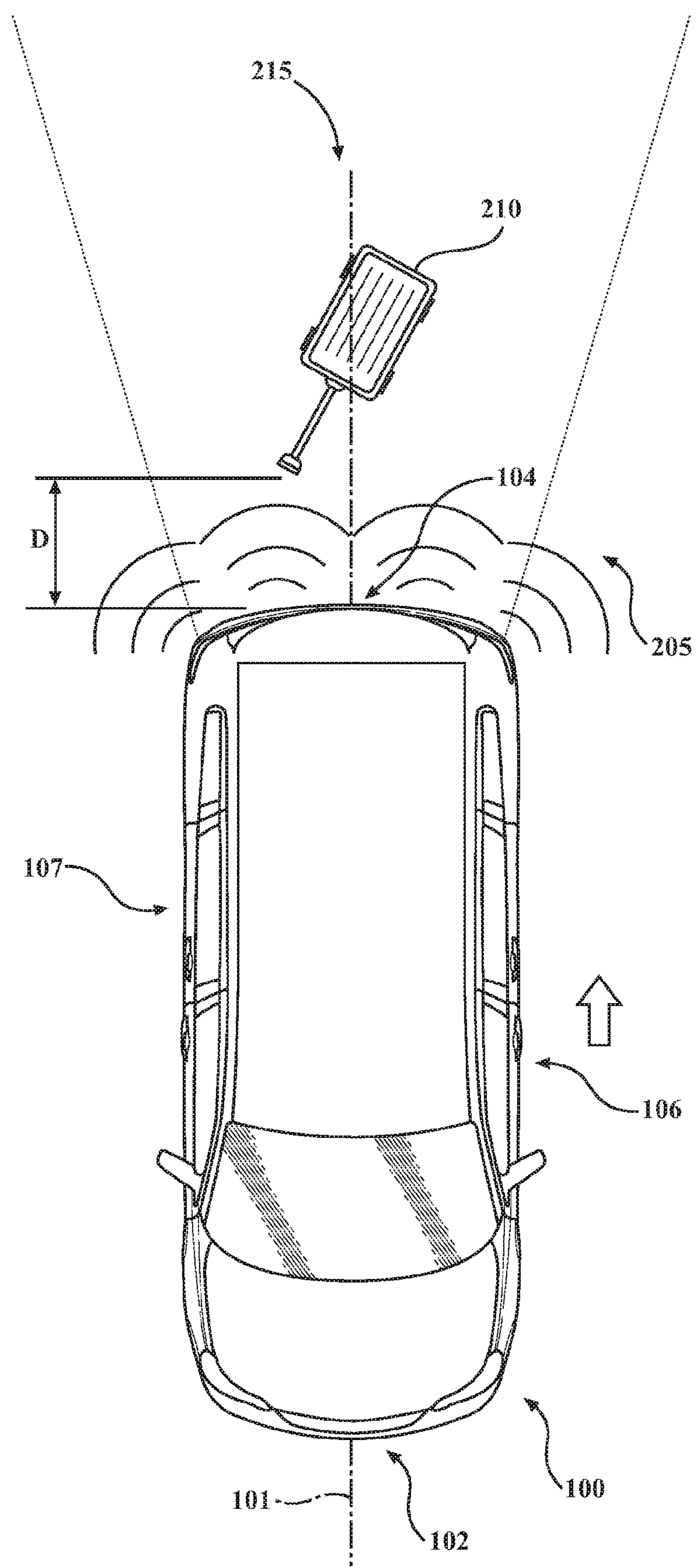
FIG. 2 is an example of a vehicle during a reverse parking operation, showing an object located in a rear environment of the vehicle.
Figure 4:
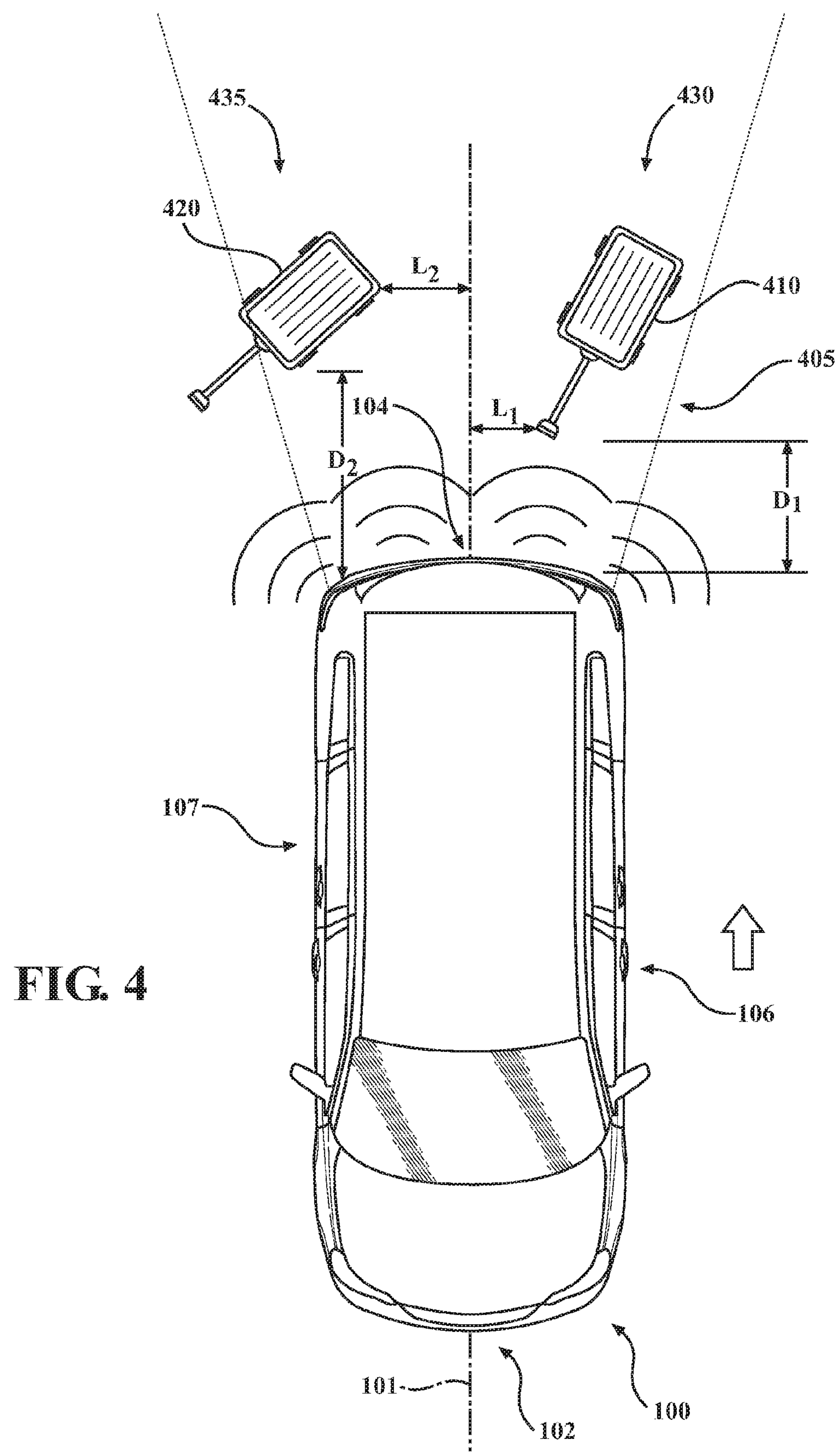
FIG. 4 is an example of a vehicle during a reverse parking operation, showing a plurality of objects located in a rear environment of the vehicle.

FIG. 2 shows an example of a rear environment 205 of the vehicle 100. Likewise, FIG. 4 shows an example of a rear environment 405 of the vehicle 100. As used herein, the phrase "rear environment of the vehicle" means an area located behind the vehicle 100. In one or more arrangements, the rear environment 205, 405 of the vehicle 100 can be the area located behind a substantially vertical plane that passes through a rotational axis 108 (FIG. 1) of the rear wheels (not shown) of the vehicle 100. The substantially vertical plane can also be substantially orthogonal to the longitudinal axis 101 of the vehicle 100. In one or more arrangements, the rear environment 205, 405 of the vehicle 100 can be the area located behind a substantially vertical plane that passes through a rearmost point of the vehicle 100 in the longitudinal direction of the vehicle 100. The substantially vertical plane can also be substantially orthogonal to the longitudinal axis 101 of the vehicle 100.

Various examples of the rear environment sensors 122 will be described herein. However, it will be understood that the embodiments are not limited to the particular sensors described. In one or more arrangements, the one or more rear environment sensors 122 can use at least in part radio signals (e.g. RADAR based sensors). The one or more radio-based sensors can be configured to detect, determine, assess, measure, quantify and/or sense, directly or indirectly, the presence of one or more objects in the rear environment 205, 405 of the vehicle 100, the position of each detected object relative to the vehicle 100 and/or the distance between each detected object and the vehicle 100 in one or more directions (e.g. in the longitudinal direction and/or in a lateral direction).

In one or more arrangements, the one or more rear environment sensors 122 can use at least in part lasers. For instance, the one or more rear environment sensors 122 can be or included as part of a laser rangefinder or a LIDAR. Such devices can include a laser source and/or laser scanner configured to emit a laser and a detector configured to detect reflections of the laser. The laser rangefinder or LIDAR may be configured to operate in a coherent or an incoherent detection mode. The one or more laser-based sensors can be configured to detect, determine, assess, measure, quantify and/or sense, directly or indirectly, the presence of one or more objects in the rear environment 205, 405 of the vehicle 100, the position of each detected object relative to the vehicle 100 and/or the distance between each detected object and the vehicle 100 in one or more directions (e.g. in the longitudinal direction and/or in a lateral direction).

In one or more arrangements, the one or more rear environment sensors 122 can use at least in part ultrasound. Such sensors can include an ultrasound source configured to emit ultrasonic signals and a detector configured to detect reflections of the ultrasonic signal. The one or more ultrasound-based rear environment sensors 122 sensors can be configured to detect, determine, assess, measure, quantify and/or sense, directly or indirectly, the presence of one or more objects in the rear environment 205, 405 of the vehicle 100, the position of each detected object relative to the vehicle 100 and/or the distance between each detected object and the vehicle 100 in one or more directions (e.g. in the longitudinal direction and/or in a lateral direction). Such detecting can be based on a characteristic (e.g. the intensity) of a reflected ultrasonic signal.

In some arrangements, the sensor system 120, the processor 105, and/or the reverse parking assist module 115 can be configured to detect, determine, assess, measure, quantify and/or sense, directly or indirectly, one or more aspects, characteristics and/or properties of a detected object. For example, the sensor system 120, the processor 105, and/or the reverse parking assist module 115 can be configured to detect, determine, assess, measure, quantify and/or sense, directly or indirectly, the size, relative size, length, width, height, a dimension, the material and/or a material property of a detected object.

Alternatively or in addition to the above, the sensor system 120 can include other types of sensors. The processor 105 can be operable to control movements of one or more of the sensors of the sensor system 120. It should be noted that any of the sensors described herein can be provided in any suitable location with respect to the vehicle 100. For instance, one or more sensors can be located within the vehicle 100 and/or one or more sensors can be located on or exposed to the exterior of the vehicle 100.

The vehicle 100 can include one or more cameras 125. "Camera" is defined as any device, component, and/or system that can capture video or image data. The camera 125 can be a rear-facing camera. "Rear-facing" means that the camera is oriented, positioned, configured, operable, movable and/or arranged to capture visual information/data (e.g. video or image data) from at least a portion of the rear environment 205, 405 of the vehicle 100.

The camera 125 can include a lens (not shown) and an image capture element (not shown). The image capture element can be any suitable type of image capturing device or system, including, for example, an area array sensor, a Charge Coupled Device (CCD) sensor, a Complementary Metal Oxide Semiconductor (CMOS) sensor, a linear array sensor, a CCD (monochrome). The image capture element may capture images in any suitable wavelength on the electromagnetic spectrum. The image capture element may capture color images and/or grayscale images.

The vehicle 100 can include an input system 130 for receiving an input from a vehicle occupant (e.g. a driver or a passenger). The input may be received in any suitable form. Any suitable input system 130 can be used, including, for example, a keypad, display, touch screen, multi-touch screen, button, joystick, mouse, trackball, microphone and/or combinations thereof.

The vehicle 100 can include an output system 135 for presenting information to a vehicle occupant. Some components of the vehicle 100 may serve dual purposes such that the component is both a component of the input system 130 and a component of the output system 135. Examples of some of the possible element of the output system 135 will be described below.

The output system 135 can include one or more forward displays 140. A "display" is defined as a component or a group of components that present information/data in visual form. "Forward display" means a display located in a front interior portion of a vehicle. As an example, the forward display 140 can be included in a dashboard or instrument panel (not shown) of the vehicle 100. As a further example, the forward display 140 can be any suitable surface in the front interior portion 198 of the vehicle 100 upon which visual information/data can be projected.

The forward display 140 can be any suitable type of display. In one or more arrangements, the forward display 140 can be a touch screen display, a multi-touch display or a remotely controlled display. A touch screen can allow a user to engage or interact with one or more displayed elements, such as a graphical user interface (GUI), and/or other applications running on any vehicle system, including any of those described herein, through contact with the forward display 140. For example, a user may make selections and move a cursor by simply touching the forward display 140 via a finger or stylus.

The forward display 140 can assist during reverse parking of the vehicle 100. In such case, the forward display 140 can be operable to present visual information/data of the rear environment 205, 405 of the vehicle 100, such as video or image information/data captured by the camera 125. Such visual information/data can be presented in real-time on the forward display 140.

The output system 135 can include one or more visual indicators 145. "Visual indicator" means one or more elements, devices, components and/or systems that can generate, produce, and/or provide a visual alert. "Visual alert" is any output that is perceptible to the human sense of sight. The one or more visual indicators 145 can visually alert a driver to the presence of an object detected in the rear environment 205, 405 of the vehicle 100.

The visual indicator 145 can be provided in the rear interior portion 199 of the vehicle 100. More particularly, the visual indicator 145 can be provided in the rear interior portion 199 of the vehicle 100. Still more particularly, the visual indicator 145 can be provided in the rear interior portion 199 in a location that can be readily seen by a driver of the vehicle 100 when the driver is looking toward the back end 104 of the vehicle 100 (e.g. while the driver is reverse parking the vehicle 100).

The visual indicator 145 can be provided in any suitable location in the rear interior portion 199 of the vehicle 100. In one or more arrangements, the visual indicator 145 can be provided on a window in the rear interior portion 199 of the vehicle 100 (e.g. rear window 180 in FIGS. 3 and 5). In one or more arrangements, the visual indicator 145 can be provided above the rear window 180 of the vehicle 100.

In one or more arrangements, the visual indicator 145 can be provided as a plurality of visual indicator elements. In one or more arrangements, at least one of the plurality of visual indicator elements can be substantially adjacent to one or more of the other visual indicator elements. In one or more arrangements, at least one of the plurality of visual indicator elements can be spaced from the other visual indicator elements. In one or more arrangements, at least one of the plurality of visual indicator elements can be connected to one or more of the other visual indicator elements.

Examples of arrangements in which the visual indicator 145 is provided above the rear window 180 of the vehicle 100 are shown in FIGS. 3 and 5. In one or more arrangements, the visual indicator 145 can extend substantially horizontally across at least a portion of an interior width Wi of the vehicle 100. As used herein, the term "substantially" includes exactly the term it modifies and slight variations therefrom. Thus, in this instance, the term "substantially horizontally" means exactly horizontal and slight variations therefrom. More particularly, at least a portion of the visual indicator 145 can extend substantially horizontally across the majority of the interior width Wi of the vehicle 100. For instance, the visual indicator 145 can extend at least about 60%, at least about 70%, least about 80%, at least about 90% or at least about 95% of the interior width Wi of the vehicle 100. Still more particularly, the visual indicator 145 can extend across the entire interior width Wi of the vehicle 100.

In one or more arrangements, at least a portion of the visual indicator 145 can extend in a direction that is substantially parallel to the longitudinal axis 101. As an example, the visual indicator 145 can extend along a portion of the interior ceiling and/or the rear window in a direction that is substantially parallel to the longitudinal axis 101. In some instances, there can be a plurality of visual indicators 145 that extend substantially parallel to the longitudinal axis 101. In such case, the plurality of visual indicators 145 can be spaced in any suitable direction, such as spaced across the interior width Wi of the vehicle 100. In other arrangements, the visual indicator 145 can extend at any suitable angle relative to the longitudinal axis 101.

In one or more arrangements, the visual indicator 145 can be substantially straight along its length. In one or more arrangements, the visual indicator 145 can include one or more non-straight portions. As an example, the visual indicator 145 can be curved along at least a portion of its length. As another example, the visual indicator 145 can include a main portion 170 and end portions 172, 174 on opposite ends of the main portion 170. At least one of the end portions 172, 174 can be angled relative to the main portion 170. In some arrangements, at least one of the end portions 172, 174 can be angled relative to the main portion 170 such that the at least one of the end portions 172, 174 extends in substantially the longitudinal direction toward the front end 102 of the vehicle 100, as is shown in FIGS. 3 and 5.

The visual indicator 145 can have an associated width Wvi. The width Wvi of the visual indicator 145 can be substantially constant along the length of the visual indicator 145. Alternatively, the width Wvi can vary in one or more regions along the length of the visual indicator 145.

In one or more arrangements, the visual indicator 145 can include one or more displays 146 (FIG. 1). FIGS. 3 and 5 show examples of arrangements in which the visual indicator 145 is a display 146. The display 146 can be any suitable type of display. For instance, the display 146 can be a liquid crystal display (LCD), a light emitting diode (LED) display or some other suitable display.

In one or more arrangements, the visual indicator 145 can include a plurality of individual light sources 147 (FIG. 1). The plurality of individual light sources 147 can generate or emit any type of light energy. In one or more arrangements, the plurality of individual light sources 147 can be electric-powered. In one or more arrangements, the plurality of individual light sources 147 can include one or more of the following types of electric-powered light sources: electron-stimulated, incandescent lamps, electroluminescent (EL) lamps, gas discharge lamps, high-intensity discharge lamps and/or lasers, just to name a few possibilities. In one or more arrangements, the plurality of individual light sources 147 can be light emitting diodes (LEDs). For instance, the plurality of individual light sources 147 can be organic LEDs, polymer LEDs, solid state lighting, LED lamps, and/or active-matrix organic LEDs. In some arrangements, the plurality of individual light sources 147 can be the same type of light source. In other arrangements, one or more of the plurality of individual light sources 147 can be a different type of light source than the other light sources.

In one or more arrangements, the visual indicator 145 can include one or more projectors 148. "Projector" means any element, device, component and/or system that can project visual information/data onto a surface. In one or more arrangements, the projector 148 can project visual information/data (e.g. a light, an image and/or a video) onto a surface in the rear interior portion 199 of the vehicle 100. For instance, the projector 148 can project visual information/data onto a window (e.g. the rear window 180 or a side window 181) located in the rear interior portion 199 of the vehicle 100. In one or more arrangements, the window or other surface in the rear interior portion 199 of the vehicle 100 can include a coating and/or other treatment to allow the visual information/data presented thereon to be visible or more readily visible from inside the vehicle 100. In one or more arrangements, the projector 148 can be a laser or other light emitting element, device, component and/or system.

The output system 135 can include one or more audial indicators 150. "Audial indicator" means any element, device, component and/or system that can generate, produce, and/or provide an audial alert. "Audial alert" is any output that is perceptible to the human sense of hearing. The one or more audial indicators 150 can audibly alert a driver to the presence of an object detected in the rear environment 205, 405 of the vehicle 100.

The audial indicators 150 can include one or more microphones, earphones and/or speakers. "Speaker" means one or more devices or components that produce sound in response to an audio signal input. Examples of speakers include, for example, electroacoustic transducers, sound chips, and sound cards. Each speaker can have one or more audio output channels (not shown) operatively connected thereto. "Audio output channel" means any suitable device, component or structure for carrying audio signals.

The vehicle 100 can include one or more vehicle systems 155. For instance, the vehicle 100 can include a transmission system 160. The transmission system 160 can include one or more mechanisms, devices, elements, components, systems, and/or combinations thereof, now known or later developed, configured to transmit mechanical power from the vehicle's engine/motor to the vehicle's wheels/tires. For instance, the transmission system 160 can include a gearbox, clutch, differential, drive shafts, and/or other elements. In arrangements where the transmission system 160 includes drive shafts, the drive shafts can include one or more axles that are configured to be coupled to the vehicle's wheels/tires.

It will of course be understood that the vehicle 100 can have other vehicle systems 155, including, for example, any of the following: a propulsion system, a braking system, a steering system, a throttle system, a signaling system and/or a navigation system, just to name a few possibilities. However, the vehicle 100 can include more, fewer, or different systems. It should be appreciated that although particular vehicle systems are separately defined, each or any of the systems or portions thereof may be otherwise combined or segregated via hardware and/or software within the vehicle 100.

According to arrangements described herein, at least a portion of the output system 135 can be activated responsive to detecting an object in the rear environment 205, 405 of the vehicle 100. More particularly, at least a portion of the output system 135 can be activated responsive to detecting an object in the rear environment 205, 405 during certain operational conditions of the vehicle 100 or by user command. For example, one or more portions of the visual indicator 145 can be activated responsive to detecting an object in the rear environment 205, 405 of the vehicle 100 while reverse parking or other reverse operation of the vehicle 100. Again, the visual indicator 145 can be located in the rear interior portion 199 of the vehicle 100.

In one or more arrangements, one or more characteristics of an output of the output system 135 can be varied to convey information about each detected object in the rear environment 205, 405 of the vehicle 100. For example, one or more characteristics of the light energy emitted from the visual indicator 145 can be varied based on an aspect, characteristic, property and/or relationship of a detected object in the rear environment 205, 405 of the vehicle 100. Various non-limiting examples of some of the possible manners in which the output system 135 can be activated and/or a characteristic of an output of the output system 135 can be varied will be described below.

The visual indicator 145 can have one or more operational modes. For instance, the visual indicator 145 can have a first operational mode, in which at least a portion of the visual indicator 145 is activated. In the first operational mode, light energy is emitted from the visual indicator 145 such that the light energy can be perceived by the human sense of sight. The visual indicator 145 can have a second operational mode, in which the visual indicator 145 is deactivated. In such case, light energy is substantially not emitted from the visual indicator 145. "Substantially not emitted" includes instances in which no light energy is emitted from the visual indicator 145 as well as instances in which a minimal amount of light energy is emitted from the visual indicator 145 such that it cannot be perceived by the human sense of sight. There can be one or more other operational modes in which the light energy is emitted from the visual indicator 145.

The visual indicator 145 can be configured to allow one or more different portions of the visual indicator 145 to be activated. The visual indicator 145 can be configured to activate one or more portions thereof. Examples of an activated portion 190 of the visual indicator 145 are shown in FIGS. 3 and 5. It should be noted that the visual indicator 145 can be configured so that a plurality of portions can be activated simultaneously or at different times. For instance, in situations in which a plurality of objects is detected in the rear environment 205, 405 of the vehicle 100, separate portions of the visual indicator 145 can be activated for each object, as is shown in FIG. 5. In some arrangements, if the two or more detected objects are located sufficiently close to each other, the two or more detected objects may be treated as a single object with respect to the activated portion 190 of the visual indicator 145. In other arrangements, if the two or more detected objects are located sufficiently close to each other, the activated portions 190 of the visual indicator 145 may at least partially overlap each other.

Each activated portion 190 of the visual indicator 145 can be substantially aligned with the location of a detected object in the rear environment 205, 405. Thus, if an object is located in a central portion of the rear environment 205, 405, then a central portion of the visual indicator 145 can be activated. If an object is located laterally to the left or the right of the vehicle 100, such as laterally to the left or to the right of the longitudinal axis 101 of the vehicle 100, then a corresponding lateral portion of the visual indicator 145 can be activated. In some arrangements, the activated portion 190 of the visual indicator 145 and a detected object can be substantially aligned such that an imaginary vertical plane extending in the longitudinal direction would simultaneously pass through a portion of the activated portion 190 of the visual indicator 145 and a portion of the detected object.

The visual indicator 145 can output light energy. The light energy can have one or more associated characteristics. For instance, the light energy can have an associated wavelength. As another example, the light energy can have an associated intensity. In this context, “intensity” means the brightness of the light energy emitted from the visual indicator 145.

In one or more arrangements, one or more characteristics of the light energy emitted from the visual indicator 145 can be varied to convey information about a detected object. For instance, the light energy emitted from the visual indicator 145 can be varied based on the proximity of a detected object to the vehicle 100. As an example, the intensity of the light energy emitted from the activated portion 190 of the visual indicator 145 can be varied based on the determined distance between the detected object and the vehicle 100. In one or more arrangements, the intensity of the light energy emitted from the activated portion 190 of the visual indicator 145 can be inversely related to a determined distance between the detected object and the vehicle 100. Thus, as the determined distance between the detected object and the vehicle 100 decreases, the intensity of the light energy emitted from the activated portion 190 of the visual indicator 145 can be increased. Further, as the determined distance between the detected object and the vehicle 100 increases, the intensity of the light energy emitted from the visual indicator 145 can be decreased. The intensity of the light energy emitted from the activated portion 190 of the visual indicator 145 can be varied on a continuous basis. Alternatively, the intensity of the light energy emitted from the activated portion 190 of the visual indicator 145 can be varied on a stepped basis. As an example, if the determined distance between the detected object and the vehicle 100 falls within a predetermined distance range, then visual indicator 145 can be caused to emit light energy at a predetermined intensity associated with the predetermined distance range.

As another example, the wavelength of the light energy emitted from the visual indicator 145 can be varied based on the proximity of a detected object to the vehicle 100. More particularly, the wavelength of the light energy emitted from the visual indicator 145 can be varied to produce different colors. The wavelength of the light energy emitted from the visual indicator 145 can be varied on a continuous basis. Alternatively, the wavelength of the light energy emitted from the visual indicator 145 can be varied on a stepped basis. As an example, if the determined distance between the detected object and the vehicle 100 falls within a first predetermined distance range, then the visual indicator 145 can be caused to emit light energy at an associated first wavelength so that the emitted light energy appears as a first color. If the determined distance between the detected object and the vehicle 100 falls within a second predetermined distance range, then the visual indicator 145 can be caused to emit light energy at an associated second wavelength so that the emitted light energy appears as a second color. The first color is different from the second color. Additional predetermined distance ranges and associated wavelengths and colors can be used.

As another example, the mode of operation of the visual indicator 145 can be varied to convey information about a detected object. For instance, the mode of operation of the visual indicator 145 can be varied based on the proximity of a detected object to the vehicle 100. As an example, the mode of operation of the visual indicator 145 can be varied based on the determined distance between the detected object and the vehicle 100. As an example, if the determined distance between the detected object and the vehicle 100 falls within a first predetermined distance range, then the activated portion of the visual indicator 145 can operated in the first operational mode. If the determined distance between the detected object and the vehicle 100 falls within a second predetermined distance range, then the visual indicator 145 can be caused to alternatingly switch between the first operational mode and the second operational mode to produce a flashing type of effect. The switching between the first and second operational modes can be performed on any suitable basis, including, for example, periodic, irregular or even random. Additional predetermined distance ranges and/or additional or different modes of operation of the visual indicator 145 can be used.

In some arrangements, an aspect of the activated portion 190 of the visual indicator 145 can be varied based on the detected object. For instance, the activated portion 190 of the visual indicator 145 can have an associated length. In one or more arrangements, the length of the activated portion 190 can be sized proportional to a detected size of a detected object. Thus, the length of the activated portion 190 of the visual indicator 145 can be relatively large if the detected object is determined to be relatively large. Similarly, the length of the activated portion 190 of the visual indicator 145 can be relatively small if the detected object is determined to be relatively small.

In one or more arrangements, one or more audial alerts can be provided responsive to detecting an object in the rear environment 205, 405 of the vehicle 100. The audial alert can be provided by activating one or more of the audial indicators 150. For example, in one or more arrangements, the audial alert can be provided by emitting one or more sounds from one or more speakers in the vehicle 100. In one or more arrangements, the one or more sounds can include a predetermined message. The audial alert can be provided in any suitable location within the vehicle 100. In one or more arrangements, the audial alert can be provided in a location within the vehicle 100 that generally corresponds to the location of the detected object in the rear environment 205, 405. Thus, if a detected object is located in a central region of the rear environment 205, 405, then the audial alert can be provided in a laterally central region along the interior width Wi of the vehicle 100.

Figure 6:
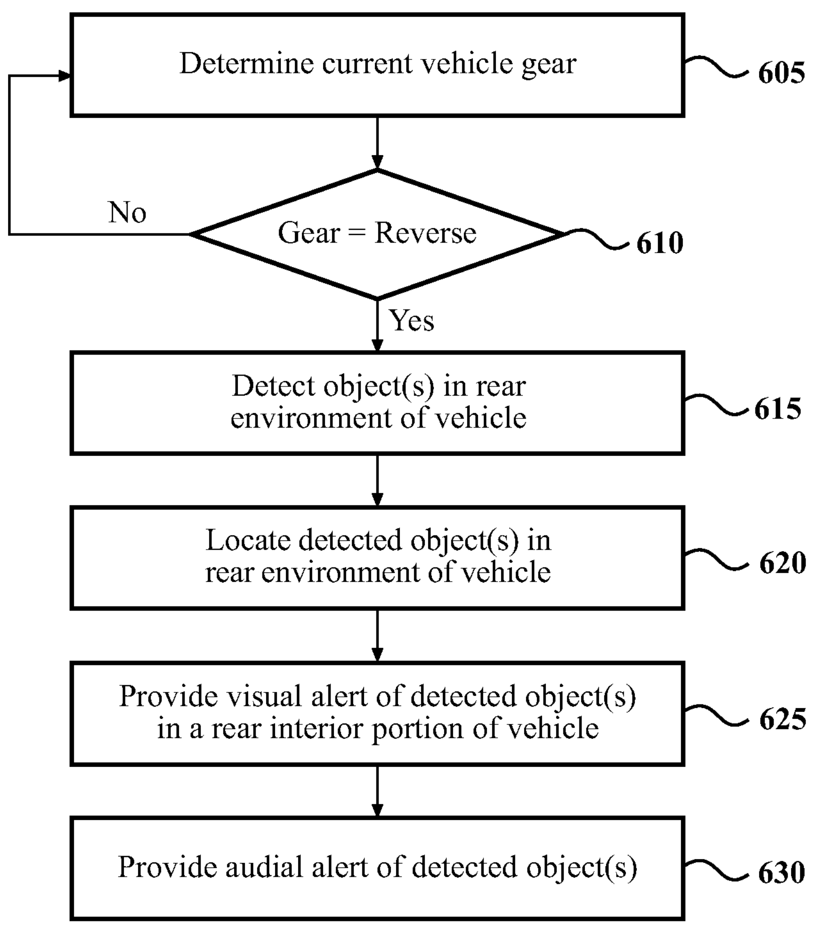
FIG. 6 is an example of a vehicle reverse parking assistance method.

Now that the various potential systems, devices, elements and/or components of the vehicle 100 have been described, various reverse parking assistance methods will now be described. Referring to FIG. 6, an example of a vehicle reverse parking assistance method 600 is shown. Various possible steps of method 600 will now be described. The method 600 illustrated in FIG. 6 may be applicable to the embodiments described above in relation to FIGS. 1-5, but it is understood that the method 600 can be carried out with other suitable systems and arrangements. Moreover, the method 600 may include other steps, blocks and/or decision blocks that are not shown here, and in fact, the method 600 is not limited to including every step, block or decision block shown in FIG. 6. The steps, blocks and/or decision blocks that are illustrated here as part of the method 600 are not limited to this particular chronological order. Indeed, some of the steps, blocks and/or decision blocks may be performed in a different order than what is shown and/or at least some of the steps, blocks and/or decision blocks shown can occur simultaneously.

Various possible steps of method 600 will now be described. At block 605, the currently engaged gear of the transmission system 160 of the vehicle 100 can be determined. At decision block 610, if the current gear is determined as being reverse, the method 600 can continue to block 615. If the current gear is determined as being non-reverse (that is, any gear other than reverse), the method 600 can return to block 605, or the method 600 can end.

While not shown in FIG. 6, the method 600 can, in some arrangements, include determining the current reverse speed of the vehicle 100. For instance, the current reverse speed of the vehicle 100 can be determined using the vehicle speed sensor(s) 123. The reverse parking assist module 115 or other element of the vehicle 100 can be configured to compare the determined current reverse speed of the vehicle 100 to a predetermined reverse speed threshold. The predetermined reverse speed threshold can be any suitable value, including, for example, 10 miles per hour (mph) or less.

The predetermined reverse speed threshold can be used to distinguish reverse parking from other reverse operations of the vehicle 100. Thus, if the determined current reverse speed of the vehicle is less than the predetermined reverse speed threshold, then it can be presumed that the vehicle 100 is reverse parking. In such case, the method 600 can continue to block 615. If the determined current reverse speed of the vehicle is equal to or above the predetermined reverse speed threshold, then it can be presumed that the vehicle 100 is not reverse parking. In such case, the method 600 can return to block 605, or the method 600 can end.

At block 615, the rear environment 205, 405 of the vehicle 100 can be detected for the presence of one or more objects in the rear environment 205, 405. The detecting of the rear environment 205, 405 can be performed by one or more sensors of the sensor system 120, such as the rear environment sensor(s) 122. In some arrangements, the detecting of the rear environment 205, 405 can be performed continuously while the current gear of the vehicle 100 is determined to be reverse. In some arrangements, the detecting of the rear environment 205, 405 can be performed at any suitable interval while the current gear of the vehicle 100 is determined to be reverse. In some arrangements, the detected objects can include all objects detected by the sensor system 120 in the rear environment 205, 405 within the range of the sensor system 120. In some arrangements, the detected objects can be a subset of the objects detected by the sensor system 120, such as those objects that are detected to be within a predetermined distance from the vehicle 100. In such case, detected objects that are located beyond the predetermined distance can be ignored or otherwise filtered and thus effectively ignored.

If one or more objects are detected in the rear environment 205, 405, the method 600 can continue to block 620. If no objects are detected in the rear environment 205, 405, the method 600 can return to block 605, or the method 600 can end.

At block 620, the detected objects can be located relative to the vehicle 100. For example, the detected objects can be located with respect to the distance from the vehicle 100 in the longitudinal direction. Alternatively or in addition, the detected objects can be located with respect to the distance from the vehicle 100 in the lateral direction, such as a lateral distance from a portion of the vehicle 100. FIG. 4 shows an example in which a lateral distance L1, L2 is determined with respect to the longitudinal axis 101 of the vehicle 100. The method 600 can continue to block 625.

At block 625, a visual alert of the detected object can be provided in the rear interior portion 199 of the vehicle 100. The visual alert can be substantially aligned with the location of the detected object in the rear environment 205, 405. The visual alert can be provided by the visual indicator 145. In one or more arrangements, the visual indicator 145 can be a display 146 located in a rear interior portion 199 of the vehicle 100. In such arrangements, at least a portion of the display 146 can be activated so that at least a portion 190 of the display 146 can be illuminated. In one or more arrangements, the visual indicator 145 can be a plurality of light sources 147. In such arrangements, one or more of the plurality of light sources 147 can be activated so that at least a portion of plurality of light sources 147 is illuminated. In one or more arrangements, the visual indicator 145 can be a projector 148. In such arrangements, the projector 148 can be activated so that visual information/data is projected onto a surface located in the rear interior portion 199 of the vehicle 100.

In some arrangements, the method can include block 630. At block 630, an audial alert of the detected objects in the rear environment 205, 405 can be provided. For instance, the audial indicator 150 can be activated to emit one or more audial outputs. As an example, the audial outputs can be emitted from one or more speakers within the vehicle 100. An audial alert can be provided for each object detected in the rear environment 205, 405. Alternatively, an audial alert can be provided for all objects detected in the rear environment 205, 405.

The audial alert can be provided at any suitable time relative to the visual alert. In one or more arrangements, the audial alert can be provided substantially simultaneously with the visual alert. In one or more arrangements, the audial alert can be provided subsequent to the visual alert. In one or more arrangements, the audial alert can be provided prior to the visual alert.

A non-limiting example of the above-described systems, methods and/or arrangements will be described in relation to FIGS. 2-3. For purposes of this example, the vehicle 100 can be in a reverse parking operation. Also, the visual indicator 145 can be a display 146 located in the rear interior portion 199 of the vehicle 100, as is shown in FIG. 3. The rear interior portion 199 of the vehicle 100 can have an associated width Wi. The display 146 can extend across the entire width Wi of the rear interior portion 199 of the vehicle 100.

The sensor system 120 (e.g. rear environment sensor(s) 122) can be operable to detect the rear environment 205 of the vehicle 100 for one or more objects, as is shown in FIG. 2. The objects can include vehicular and non-vehicular objects. For instance, the non-vehicular objects can include people, animals, signs, and/or other objects. The objects can be stationary and/or the objects can be non-stationary.

In this example, the object can be a wagon 210 that is located in the rear environment 205 of the vehicle 100, as is shown in FIG. 2. More particularly, the wagon 210 can be located in a central region 215 of the rear environment 205.

The wagon 210 can be detected by the sensor system 120. The detected wagon 210 can be located relative to the vehicle 100. For instance, one or more sensors from the sensor system 120 can be used to locate the wagon 210. The wagon 210 can be located in any suitable manner. For instance, the wagon 210 can be located with respect to the longitudinal distance D between the wagon 210 and the back end 104 of the vehicle 100. Further, the wagon 210 can be located laterally with respect to the vehicle 100. For instance, a lateral distance between the wagon 210 and the vehicle 100 can be determined. The lateral distance can be determined in a direction that is substantially 90 degrees transverse to the longitudinal direction. In one or more arrangements, the lateral distance can be determined between a portion of the wagon 210 and the longitudinal axis 101 of the vehicle 100. In some arrangements, since the longitudinal axis 101 of the vehicle is in line with the wagon 210, the lateral distance may be considered to be zero if the lateral distance is determined with respect to the longitudinal axis 101.

Upon detection of the wagon 210, a visual alert can be provided in a rear interior portion 199 of the vehicle 100 to alert a driver of the presence of an object in the vehicle's reverse path. The visual alert can be provided by activating a portion 190 of the display 146. More particularly, the activated portion 190 of the display 146 can be substantially aligned with the location of the detected wagon 210 in the rear environment 205. In this example, a central portion 191 of the display 146 can be activated, as is shown in FIG. 3. This central portion 191 of the display 146 can be substantially aligned with the wagon 210, which is located in the central region 215 of the rear environment 205.

A driver who is looking rearward while reverse parking the vehicle 100 may not see the wagon 210. In some arrangements, the rear environment 205 of the vehicle 100, including the wagon 210, may be presented on the forward display 140 of the vehicle 100. However, the driver may not see the display because he or she is looking toward the back end 104 of the vehicle 100 while reverse parking. By providing a visual alert in the rear interior portion 199 of the vehicle 100, a rearward-looking driver can be apprised of the presence of the wagon 210 and/or the location of the wagon 210. With such information, the driver can proceed with reverse parking of the vehicle 100 as appropriate.

In some arrangements, an audial alert can be provided to alert a driver of the presence of the wagon 210 in the vehicle's reverse path. The audial alert can be provided by emitting one or more sounds from the audial indicator 150, such as by emitting one or more sounds from one or more speakers. In one or more arrangements, a predetermined message can be emitted from one or more speakers or other audial indicator 150. The audial alert can be provided in a location that substantially corresponds in the lateral direction to the location of the detected object.

The visual alert can be provided during the entire reverse parking process if an object is detected. In one or more arrangements, one or more aspects of the visual alert can be varied to convey information about a detected wagon 210 in the rear environment 205 of the vehicle 100. For instance, the output of the visual indicator 145 can be varied based on the proximity of the detected wagon 210 to the vehicle 100. As an example, the intensity of the light output of the visual indicator 145 can be varied based on the determined distance between the detected wagon 210 and the vehicle 100. In one or more arrangements, the intensity of the activated portion 190 of the display 146 can be increased as the distance between the vehicle 100 and the wagon 210 decreases. Likewise, the intensity of the activated portion 190 of the display 146 can be decreased as the distance between the vehicle 100 and the wagon 210 increases.

Another non-limiting example of the above-described systems, methods and/or arrangements will be described in relation to FIGS. 4-5. For purposes of this example, the vehicle 100 can be in a reverse parking operation. Also, the visual indicator 145 can be a display 146 located in the rear interior portion 199 of the vehicle 100, as is shown in FIG. 5. The display can extend across the entire interior width Wi of the rear interior portion 199 of the vehicle 100.

The sensor system 120 (e.g. rear environment sensor(s) 122) can be operable to detect the rear environment 405 of the vehicle 100 for one or more objects, as is shown in FIG. 4. In this example, there can be two objects (e.g. a first wagon 410 and second wagon 420) located in the rear environment 405 of the vehicle 100. More particularly, the first wagon 410 can be located in toward the first side 106 of the vehicle 100, and the second wagon 420 can be located toward the second side 107 of the vehicle 100. Thus, the first wagon 410 can be located in a first lateral region 430 of the rear environment 405, and the second wagon 420 can be located in a second lateral region 435 of the rear environment 405.

The first and second wagon 410, 420 can be detected by the sensor system 120. The detected first and second wagon 410, 420 can be located relative to the vehicle 100. The first and second wagons 410, 420 may be located in any suitable manner. For instance, one or more sensors from the sensor system 120 can be used to locate the first and second wagons 410, 420. The first and second wagons 410, 420 can be located in any suitable manner. For instance, the first and second wagons can be located with respect to the longitudinal distance D1, D2 respectively between each of the first and second wagons 410, 420 and the back end 104 of the vehicle 100. Further, the first and second wagons 410, 420 can be located laterally with respect to the vehicle 100. For instance, a lateral distance L1, L2 between each wagon 410, 420 and the vehicle 100 can be determined. In one or more arrangements, the lateral distance L1, L2 can be determined between a portion of each wagon 410, 420 and the longitudinal axis 101 of the vehicle 100.

Upon detection of the wagons 410, 420, a visual alert can be provided in a rear interior portion 199 of the vehicle 100 to alert a driver of the presence of an object in the vehicle's reverse path. The visual alert can be provided by activating a portion 190 of the display 146 for each of the detected wagons 410, 420. In this example, since the wagons 410, 420 are spaced from each other in the lateral direction, the activated portions 190 of the display 146 can be spaced apart. Each of the activated portions 190 of the display 146 can be substantially aligned with the location of the detected wagon 410, 420 in the rear environment 405. In this example, a first lateral region 192 and a second lateral region 193 of the display 146 are activated, as is shown in FIG. 3. The first lateral region 192 of the display 146 can be substantially aligned with the first wagon 410, which is located in the first lateral region 430 of the rear environment 405. The second lateral region 193 of the display 146 can be substantially aligned with the second wagon 420, which is located in the second lateral region 435 of the rear environment 405.

A driver who is looking rearward while reverse parking the vehicle 100 may not see one or both of the wagons 410, 420. By providing a visual alert in the rear interior portion 199 of the vehicle 100, a rearward-looking driver can be apprised of the presence of the first and second wagons 410, 420 and/or the location of each of the wagons 410, 420. With such information, the driver can proceed with reverse parking of the vehicle 100 as appropriate.

In one or more arrangements, one or more aspects of the visual alert can be varied to convey information about the detected wagons 410, 420 in the rear environment 405 of the vehicle 100. The varying of the aspects of the visual alert can be performed independently for each detected wagon 410, 420. As an example, if the first and second wagons 410, 420 are located at different longitudinal distances D1, D2 from the vehicle 100, then the activated portion 190 of the display 146 corresponding to the first wagon 410 may appear different than the activated portion 190 of the display 146 corresponding to the second wagon 420. For instance, the light energy emitted from the activated portions 190 may be different.

In some arrangements, an audial alert can be provided to alert a driver of the presence of the wagons 410, 420 in the vehicle's reverse path. An audial alert can be provided for each wagon 410, 420, or an audial alert can be provided for both wagons 410, 420.

It will be appreciated that arrangements described herein can provide numerous benefits, including one or more of the benefits mentioned herein. For example, arrangements described herein can reduce risks and/hazards associated with reverse parking. Arrangements describe herein can allow a driver to look toward the rear of vehicle when reverse parking, thereby supporting a driver's natural tendency to look rearward when reverse parking a vehicle. Arrangements described herein can allow a driver to reverse park a vehicle safely without looking at a front display in the instrument panel. Arrangements described herein can increase confidence of driver when reverse parking. Arrangements described herein can enhance the usefulness and/or usability of vehicular parking assist system. Arrangements described herein can provide a rearward-looking driver with visual feedback of the location of an object in the rear environment and the distance of the object relative to rear of the vehicle, which the driver cannot normally see.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

Aspects herein can be embodied in other forms without departing from the spirit or essential attributes thereof. Accordingly, reference should be made to the following claims, rather than to the foregoing specification, as indicating the scope of the invention.

What is claimed is:

1. A reverse parking assistance method for a vehicle comprising:

sensing a rear environment of the vehicle to detect one or more objects located in the rear environment; and responsive to detecting an object in the rear environment, providing a visual alert of the detected object in a rear interior portion of the vehicle, the visual alert being substantially aligned with a relative lateral position of the detected object in the rear environment, whereby a rearward-looking driver is visually alerted of the presence of the detected object in the rear environment.

2. The method of claim 1, wherein providing a visual alert of the detected object in a rear interior portion of the vehicle includes activating a portion of a display located in a rear interior portion of the vehicle, and wherein the activated portion of the display is substantially aligned with the relative lateral position of the detected object in the rear environment.

3. The method of claim 2, wherein the object is a first object and the portion of the display is a first portion of the display, and further including:
responsive to detecting a second object in the rear environment, activating a second portion of the display located in the rear interior portion of the vehicle, wherein the activated second portion of the display is substantially aligned with the relative lateral position of the detected second object in the rear environment.

4. The method of claim 1, further including varying a characteristic of the visual alert based on a detected aspect of the detected object in the rear environment of the vehicle.

5. The method of claim 4, wherein the detected aspect is a detected distance between the object and the vehicle.

6. The method of claim 4, wherein the visual alert is provided by a visual indicator configured to emit light energy, wherein the light energy has an associated intensity, and wherein the characteristic is the intensity of the light energy emitted from the visual indicator.

7. The method of claim 4, wherein varying a characteristic of the visual alert based on a detected aspect of the detected object in the rear environment of the vehicle includes varying a length of the visual alert in a lateral direction of the vehicle based on a detected size of the detected object.

8. The method of claim 1 further including:
responsive to detecting an object in the rear environment, providing an audial indicator of the detected object, whereby one or more sounds is emitted to alert a driver of the presence of the detected object.

9. A reverse parking assistance system for a vehicle comprising:
a vehicle, the vehicle having a rear interior portion;
a sensor system configured to sense a rear environment of the vehicle to detect one or more objects located in the rear environment;
a visual indicator; and
a processor located onboard the vehicle, the processor being operatively connected to the sensor system and the visual indicator, the processor being programmed to initiate executable operations comprising:
responsive to detecting an object in the rear environment, activating a portion of the visual indicator, the activated portion of the visual indicator being substantially aligned with a relative lateral position of the detected object in the rear environment, whereby a visual alert of the presence of the detected object is provided to a rearward-looking driver.

10. The system of claim 9, wherein the visual indicator is a display located in a rear interior portion of the vehicle.

11. The system of claim 10, wherein the object is a first object, wherein activating a portion of the visual indicator includes activating a first portion of the display, wherein the activated first portion of the display is substantially aligned with the relative lateral position of the detected first object in the rear environment, and
wherein the processor is programmed to initiate executable operations further comprising:
responsive to detecting a second object in the rear environment, activating a second portion of the display, wherein the activated second portion of the display is substantially aligned with a relative lateral position of the detected second object in the rear environment.

12. The system of claim 9, wherein the visual indicator is located above a rear window of the vehicle.

13. The system of claim 9, wherein the processor is programmed to initiate executable operations further comprising:
varying a characteristic of the visual alert based on a detected aspect of the detected object in the rear environment of the vehicle.

14. The system of claim 13, wherein the detected aspect is a detected distance between the object and the vehicle.

15. The system of claim 13, wherein the activated portion of the visual indicator is configured to emit light energy, wherein the light energy has an associated intensity, and wherein the characteristic is the intensity of the light energy emitted from the visual indicator.

16. The system of claim 13, wherein varying a characteristic of the visual alert based on a detected aspect of the detected object in the rear environment of the vehicle includes varying a length of the visual alert in a lateral direction of the vehicle based on a detected size of the detected object.

17. The system of claim 9, further including:
an audial output, and
wherein the processor is programmed to initiate executable operations further comprising:
responsive to detecting an object in the rear environment, providing an audial indicator of the detected object, whereby one or more sounds is emitted to alert a driver of the presence of the detected object.

18. A reverse parking assistance system for a vehicle comprising:
a vehicle, the vehicle having a rear interior portion, wherein the rear interior portion of the vehicle has a lateral width;
a sensor system configured to sense a rear environment of the vehicle to detect one or more objects located in the rear environment;
a visual indicator, the visual indicator extending substantially horizontally across at least a majority of the lateral width of the rear interior portion of the vehicle; and
a processor located onboard the vehicle, the processor being operatively connected to the sensor system and the visual indicator, the processor being programmed to initiate executable operations comprising:
responsive to detecting an object in the rear environment, activating at least a portion of the visual indicator, whereby a visual alert of the presence of the detected object is provided to a rearward-looking driver.

19. A computer program product for assisting a driver during reverse parking of a vehicle, the computer program product comprising a computer readable storage medium having program code embodied therewith, the program code executable by a processor to perform a method comprising:
sensing a rear environment of the vehicle to detect one or more objects located in the rear environment; and
responsive to detecting an object in the rear environment, providing a visual alert of the detected object in a rear interior portion of the vehicle, the visual alert being substantially aligned with a relative lateral position of the detected object in the rear environment, whereby a rearward-looking driver is visually alerted of the presence of the detected object in the rear environment.

20. The computer program product of claim 19, wherein providing a visual alert of the detected object in a rear interior portion of the vehicle includes activating a portion of a display located in a rear interior portion of the vehicle, and wherein the activated portion of the display is substantially aligned with a relative lateral position of the detected object in the rear environment.

21. The computer program product of claim 19, wherein the method further includes:

varying a characteristic of the visual alert based on a detected aspect of the detected object in the rear environment of the vehicle.

22. The computer program product of claim 21, wherein varying a characteristic of the visual alert based on a detected aspect of the detected object in the rear environment of the vehicle includes varying a length of the visual alert in a lateral direction of the vehicle based on a detected size of the detected object.

23. The computer program product of claim 19, wherein the method further includes:

responsive to detecting an object in the rear environment, providing an audial indicator of the detected object, whereby one or more sounds is emitted to alert a driver of the presence of the detected object.

* * * * *